United States Patent
Lee

(10) Patent No.: US 7,447,898 B2
(45) Date of Patent: Nov. 4, 2008

(54) SYSTEM AND METHOD FOR BIOS SETUP

(75) Inventor: Ming-Lung Lee, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 300 days.

(21) Appl. No.: 11/309,736

(22) Filed: Sep. 20, 2006

(65) Prior Publication Data

US 2007/0130375 A1    Jun. 7, 2007

(30) Foreign Application Priority Data

Nov. 16, 2005    (CN)    ........................ 2005 1 0101506

(51) Int. Cl.
  *G06F 9/00*    (2006.01)
  *G06F 3/00*    (2006.01)
(52) U.S. Cl. ................. 713/2; 713/1; 715/700
(58) Field of Classification Search ........................ 713/2
  See application file for complete search history.

(56) References Cited

U.S. PATENT DOCUMENTS

| 6,047,373 | A  | * | 4/2000  | Hall et al. ........................ 713/1 |
| 7,032,095 | B2 |   | 4/2006  | Stephan et al. |
| 7,234,054 | B2 | * | 6/2007  | Rothman et al. ................ 713/2 |
| 7,310,740 | B2 | * | 12/2007 | Price et al. ................... 713/320 |
| 2005/0144432 | A1 | * | 6/2005 | Wu ................................ 713/2 |
| 2005/0234931 | A1 | * | 10/2005 | Yip et al. ..................... 707/100 |

* cited by examiner

*Primary Examiner*—Suresh K Suryawanshi
(74) *Attorney, Agent, or Firm*—Winston Hsu

(57) ABSTRACT

An exemplary method for BIOS setup includes the steps of: setting selectable options of device configurations according to parameter ranges of device configurations of the BIOS, each selectable option corresponding to a selection indicator, each selection indicator corresponding to a type of color and an alarm sound; modifying working condition parameters of the device configurations; determining whether the new configuration values are dangerous values; determining the selection indicator according to corresponding selectable options of device configurations if any new configuration value is a dangerous value; and displaying the device configuration with corresponding color, and alarming with the corresponding alarm sound. A related system for BIOS setup is also disclosed.

12 Claims, 2 Drawing Sheets

SYSTEM AND METHOD FOR BIOS SETUP

FIELD OF THE INVENTION

The present invention is generally related to a system and method for basic input/output system (BIOS) setup.

DESCRIPTION OF RELATED ART

During the power on self test (POST) the basic input/output system (BIOS) retrieves, from a complementary metal-oxide-semiconductor transistor (CMOS) memory, values that are used to initialize various devices within a computer system. The BIOS interrogates each device in turn to determine its register requirements. The BIOS retrieves values from the CMOS memory that are appropriate to the device.

As devices are added or removed from the computer system, the parameters stored by the CMOS will have to be changed accordingly. Conventionally, these changes are achieved using the CMOS or BIOS setup program. The BIOS setup enables a computer to be configured according to its resident hardware. It allows, amongst other things, to change the parameters with which the BIOS configures the chipset, storage devices, memory configuration etc. The BIOS setup can be executed when the computer system is powered on, by depressing a key during, or immediately before, the POST. The key varies according to computer systems or BIOS manufacturers but, in many instances, is usually the "F2" key or the "Del" key.

The BIOS setup provides a very basic user interface with very limited graphics capabilities for varying the CMOS parameters. To complicate matters, there has been little standardization of terminology between BIOS vendors and the many chipset and motherboard manufacturers. Furthermore, some parameters are defined by BIOS vendors, some by chipset designers and some by motherboard designers. Parameters intended for use in design and development are intermixed with parameters intended to be adjusted by technicians. Still further, the very limited graphical user interface presented by the BIOS set up does not comply with, for example, requirements for providing user interface that can displaying whether the values of device configurations that are modified by the user are the dangerous values.

Therefore, what is needed is a system and method for BIOS setup, which can displays dangerous visually.

SUMMARY OF THE INVENTION

A system for basic input output system (BIOS) setup is provided, in accordance with a preferred embodiment. The system typically includes a setting module, a receiving module, a determining module, an analyzing module and a processing module. The setting module is configured for setting selectable options of device configurations of the BIOS according to parameter ranges of each device configuration. Each working condition parameter of the device configurations corresponds to a selection indicator, and each selection indicator corresponds to a type of color and an alarm sound. The receiving module is configured for receiving new configuration values of the device configurations. The determining module is configured for determining whether the new configuration values of device configurations are dangerous values. The analyzing module configured for analyzing the new configuration values of device configurations, and determining a corresponding selection indicator according to the selectable options of device configurations if any new configuration value is a dangerous value. The processing module configured for displaying the device configuration with corresponding color according to the corresponding selection indicator, and alarming with a corresponding alarm sound.

A method for BIOS setup is provided. The method includes the steps of: setting selectable options of device configurations according to parameter ranges of device configurations of the BIOS, each selectable option corresponding to a selection indicator, each selection indicator corresponding to a type of color and an alarm sound; modifying working condition parameters of the device configurations; determining whether the new configuration values are dangerous values; determining a selection indicator according to corresponding selectable options of device configurations if any new configuration value is a dangerous value; and displaying the device configuration of the working condition parameter that is dangerous value with a corresponding type of color, and alarming with a corresponding alarm sound.

Another system for BIOS setup is provided. The system typically includes a setting module, a receiving module and a determining module. The setting module is configured for setting selectable options of device configurations of the BIOS according to parameter ranges of each device configuration. Each working condition parameter of the device configurations corresponds to a selection indicator. Each selection indicator corresponds to a type of color and an alarm sound. The receiving module is configured for receiving new configuration values of the device configurations. The determining module is configured for determining whether the new configuration values of device configurations are dangerous values.

Other systems, methods, features, and advantages of the present invention will be or become apparent to one with skill in the art upon examination of the following drawings and detailed description.

DETAILED DESCRIPTION OF THE INVENTION

Figure 1:
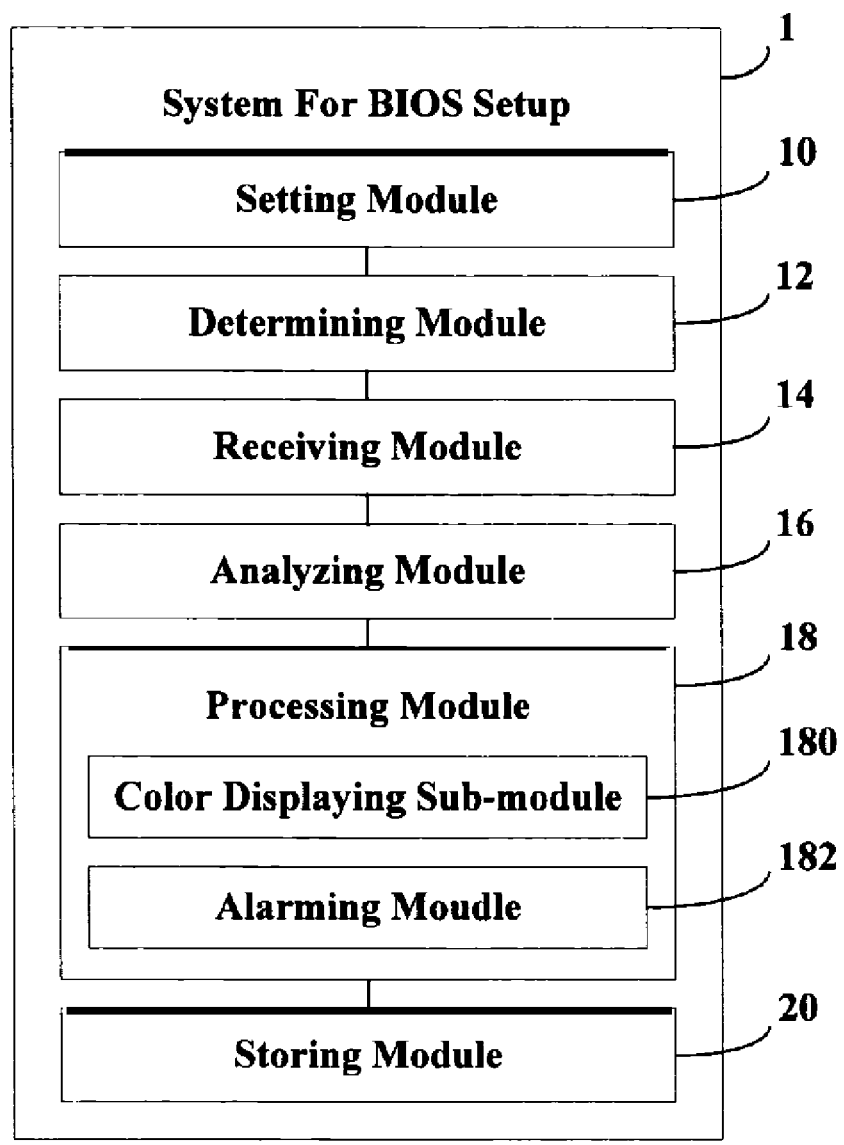
FIG. 1 is a schematic diagram of software function modules of a system for basic input output system (BIOS) setup, in accordance with one embodiment.

FIG. 1 is a schematic diagram of software function modules of a basic input output system (BIOS) setup system (hereinafter, "the system 1"), in accordance with one embodiment. The system 1 is executable in a computer (not shown), and is used for configuring BIOS parameters and ensuring that the computer is configured for working in an optimal condition. The system 1 typically includes: a setting module 10, a determining module 12, a receiving module 14, an analyzing module 16, a processing module 18, and a storing module 20.

The setting module 10 is configured for setting at least one selectable option for each device configuration of the BIOS configured in a motherboard according to the type of the motherboard. Each selectable option corresponds to a selection indicator. Each selection indicator corresponds to a color and an alarm sound. The selectable options typically include parameters or parameter ranges. The device configurations of the BIOS mainly include a central processing unit (CPU) frequency, the CPU voltage, a memory voltage, and the memory frequency, etc. The determining module 12 is configured for determining whether the setting module 10 needs to set other device configurations of the BIOS.

The receiving module 14 is configured for receiving new configuration values of the device configurations. The determining module 12 determines whether the new configuration values are dangerous values according to the selectable options of the device configurations. The determining module 12 is further configured for determining whether the new configuration values are saved.

The analyzing module 16 is configured for analyzing the new configuration values and determining a selection indicator for each new configuration values if the new configuration values are dangerous values.

The processing module 18 is configured for processing analyzing results (i.e., the results from the analyzing module 16 is a dangerous value, the processing module 18 alarms). The processing module 18 includes a color displaying sub-module 180 and an alarm sub-module 182. The color displaying sub-module 180 is configured for displaying the device configurations of each new configuration value with a corresponding type of color if the new configuration values are dangerous values, and the alarming sub-module 182 alarms with a corresponding alarm sound.

For example, if the standard voltage of the CPU is 1.5 volts, the setting module 10 sets one selectable option of the CPU voltage between 1.05 volts and 1.8 volts, furthermore, the selection indicator is in a first level if the CPU voltage is 1.8 volts. The first level corresponds to a red color, and the corresponding alarm sound is "beep". If the standard working voltage of the CPU is 1.5 volts, the modified voltage of the CPU received by the receiving module 14 is 1.8 volts, the determining module 12 determines the modified voltage is the dangerous value, the analyzing module 16 analyzes the dangerous value and determines the selection indicator is the first level, and the color displaying sub-module 180 displays the device configuration of the CPU with red color, and the alarm sub-module 182 sounds a "beep"; if the CPU voltage is not a dangerous value, the processing module 18 displays the device configuration of the CPU normally.

The storing module 20 is configured for saving the new configuration values.

Figure 2:
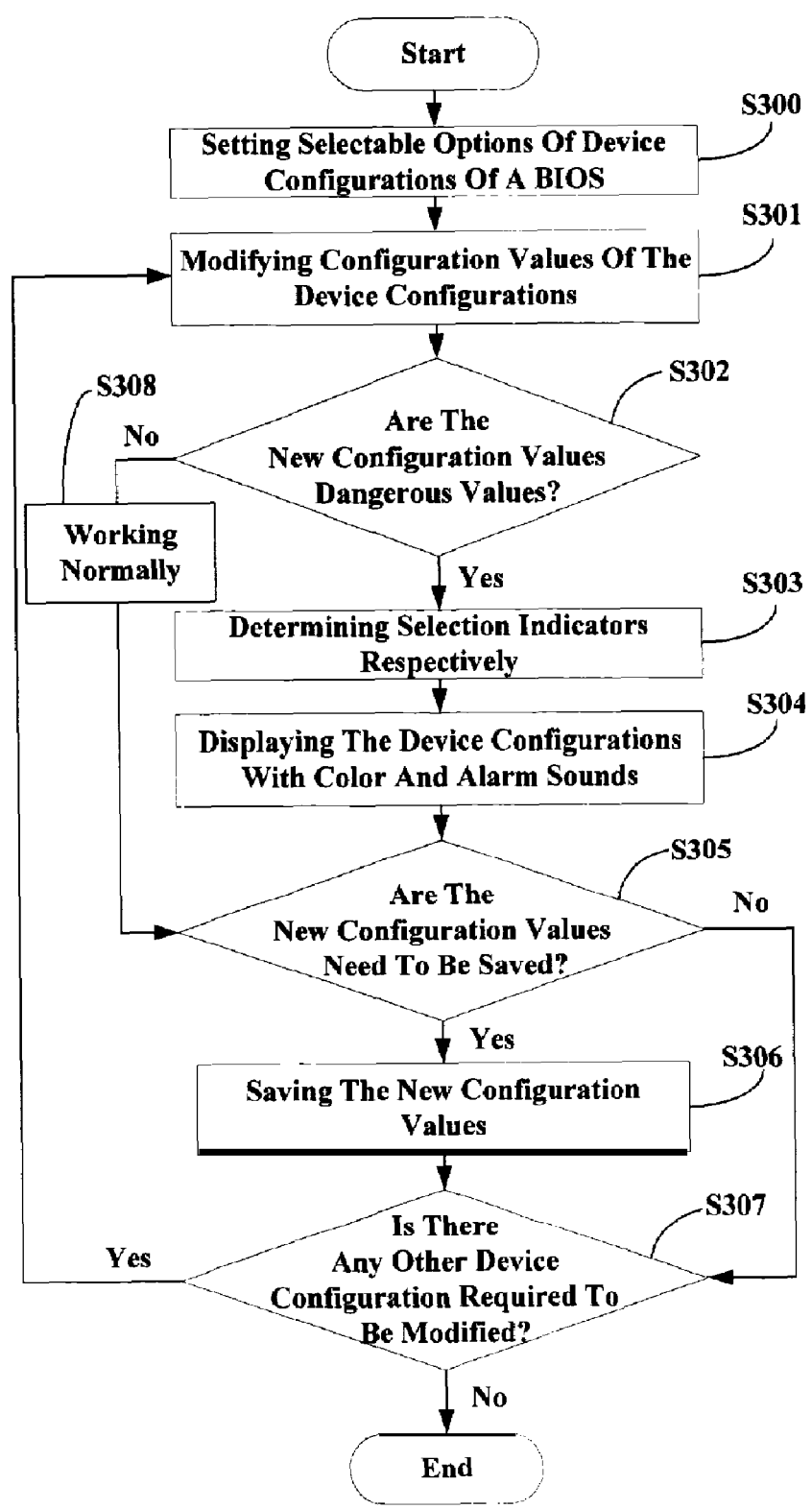
FIG. 2 is a flowchart of a preferred method for BIOS setup, in accordance with one embodiment.

FIG. 2 is a flowchart of a preferred method for BIOS setup, in accordance with one embodiment. In step S300, the setting module 10 sets the selectable options of the device configurations of the BIOS before BIOS setup. Each selectable option corresponds to one selection indicator, and each selection indicator corresponds to one color and one alarm sound. The selectable options include parameters or parameter ranges, and comply with standard working condition parameters in the art. The device configurations of the BIOS mainly include the CPU frequency, the CPU voltage, the memory voltage and the memory frequency, etc.

In step S301, the receiving module 14 receives the new configuration values of the device configurations. The new configuration values can be selected from the selectable options of the device configurations.

In step S302, the determining module 12 determines whether the new configuration values are dangerous values according to corresponding selectable options of the device configurations.

In step S303, the analyzing module 16 analyzes the new configuration values and determines selection indicators respectively if the new configuration values are dangerous values.

In step S304, the color displaying sub-module 180 displays corresponding device configurations with corresponding color, and the alarm sub-module 182 outputs corresponding alarm sounds.

In step S305, the determining module 12 determines whether the new configuration values are required to be saved.

In step S306, the storing module 20 saves the new configuration values that are required to be saved.

In step S307, the determining module 12 determines whether other device configurations of the BIOS need to be modified. The process returns to step S301 if the other device configurations of the BIOS are required to be modified.

In step S308, the processing module 18 displays the device configurations of the BIOS in normally if the new configuration values are not dangerous values, and the process goes to step S305.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for basic input/output system (BIOS) setup, the system comprising:
a setting module configured for setting selectable options of device configurations of the BIOS according to parameter ranges of each device configuration, each working condition parameter of the device configurations corresponding to a selection indicator, each selection indicator corresponding to a type of color and an alarm sound;
a receiving module configured for receiving new configuration values of the device configurations;
a determining module configured for determining whether the new configuration values of device configurations are dangerous values;
an analyzing module configured for analyzing the new configuration values of device configurations, and determining a corresponding selection indicator according to the selectable options of device configurations if any new configuration value is a dangerous value; and
a processing module configured for displaying the device configuration with corresponding color according to the corresponding selection indicator, and alarming with a corresponding alarm sound.

2. The system according to claim 1, wherein the determining module is further configured for determining whether the working condition parameters of device configurations are required to be stored.

3. The system according to claim 2, further comprising a storing module configured for saving the working condition parameters of device configurations.

4. The system according to claim 1, wherein the processing module comprises:
a color displaying sub-module configured for displaying the working condition parameter that is dangerous value with a corresponding type of color according to the selection indicator; and
an alarm sub-module configured for alarming with a corresponding sound according to the selection indicator.

5. The system according to claim 1, wherein the new configuration values are selected from corresponding selectable options of device configurations.

6. A method for basic input/output system (BIOS) setup, the method comprising the steps of:
- setting selectable options of device configurations according to parameter ranges of device configurations of the BIOS, each selectable option corresponding to a selection indicator, each selection indicator corresponding to a type of color and an alarm sound;
- modifying working condition parameters of the device configurations;
- determining whether the new configuration values are dangerous values;
- determining a selection indicator according to corresponding selectable options of device configurations if any new configuration value is a dangerous value; and
- displaying the device configuration of the working condition parameter that is dangerous value with a corresponding type of color, and alarming with a corresponding alarm sound.

7. The method according to claim 6, further comprising the steps of:
- determining whether the new configuration values are required to be saved;
- saving the new configuration values if any new configuration value is required to be saved;
- determining whether the other device configurations are required to be set; and
- returning to the step of modifying the working condition parameters if any device configuration is required to be set.

8. The method according to claim 6, further comprising the step of:
- determining whether the other device configurations are required to be set if the new configuration values are not required to be saved.

9. The method according to claim 6, further comprising the step of:
- displaying the device configurations of the new configuration values in normal if the new configuration values are not dangerous values.

10. The method according to claim 6, wherein the step of modifying the working condition parameters of the device configurations comprises the step of selecting a selectable option from the device configurations.

11. A system for basic input/output system (BIOS) setup, the system comprising:
- a setting module configured for setting selectable options of device configurations of the BIOS according to parameter ranges of each device configuration, each working condition parameter of the device configurations corresponding to a selection indicator, each selection indicator corresponding to a type of color and an alarm sound;
- a receiving module configured for receiving new configuration values of the device configurations; and
- a determining module configured for determining whether the new configuration values of device configurations are dangerous values.

12. The system according to claim 11, further comprising an analyzing module configured for analyzing the new configuration values of device configurations, and determining a corresponding selection indicator according to the selectable options of device configurations if any new configuration value is a dangerous value.

* * * * *